Sept. 5, 1950 S. E. GAIL 2,521,510
DYNAMOELECTRIC MACHINE
Filed Oct. 10, 1946
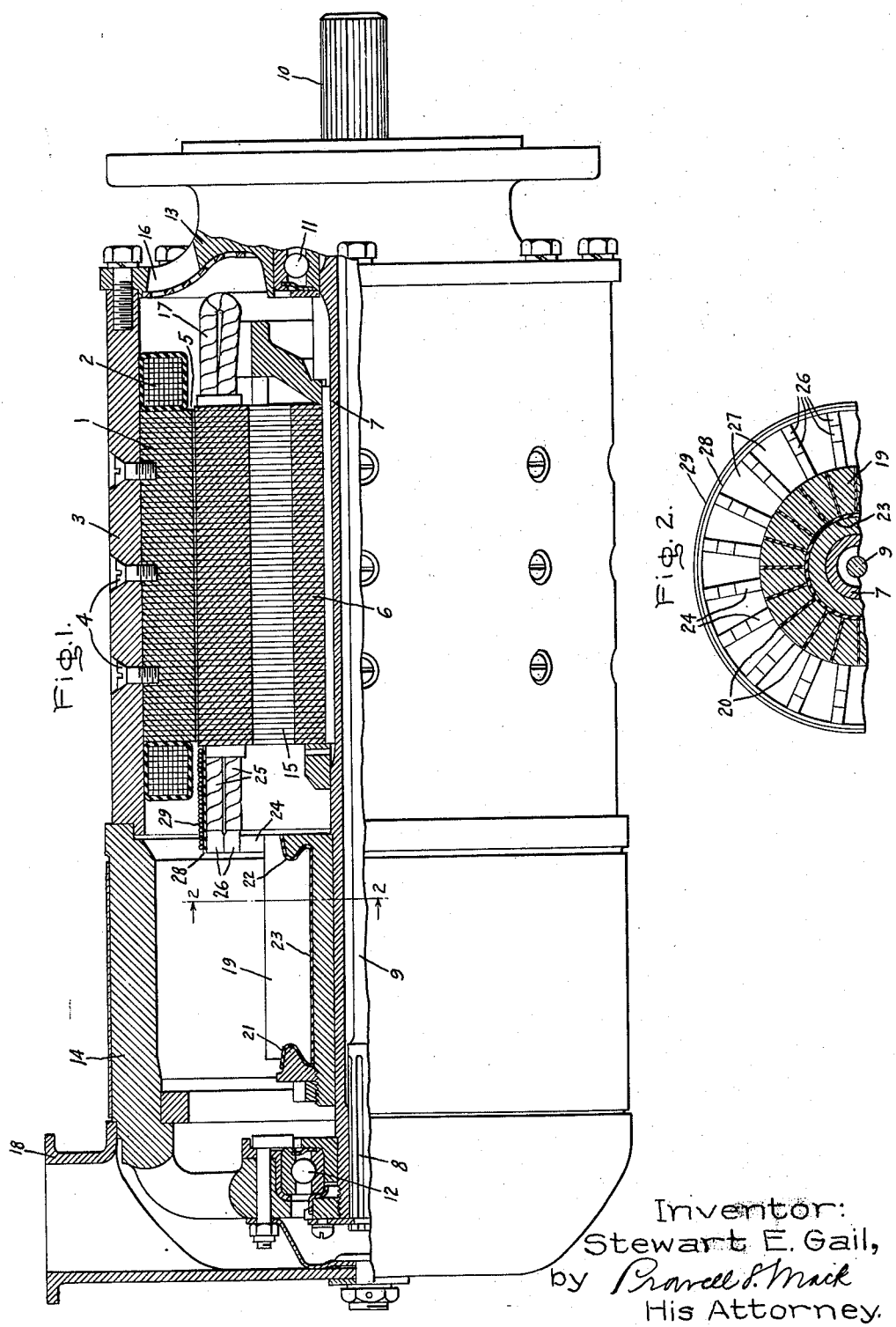
Inventor:
Stewart E. Gail,
by Parcell P. Mack
His Attorney.

Patented Sept. 5, 1950

2,521,510

UNITED STATES PATENT OFFICE 2,521,510

DYNAMOELECTRIC MACHINE

Stewart E. Gail, Lynn, Mass., assignor to General Electric Company, a corporation of New York Application October 10, 1946, Serial No. 702,471

5 Claims. (Cl. 171—252)

1

My invention relates to dynamoelectric machine armatures and particularly to an improved construction for more effectively ventilating and cooling such armatures.

An object of my invention is to provide an improved dynamoelectric machine armature.

Another object of my invention is to provide an improved dynamoelectric machine construction for more effectively ventilating the same.

Further objects and advantages of my invention will become apparent and my invention will be better understood from the following description referring to the accompanying drawing, and the features of novelty which characterize my invention will be pointed out with particularity in the claims annexed to and forming part of this specification.

In the drawing, Fig. 1 is a side elevational view, partly in section, illustrating a dynamoelectric machine provided with an embodiment of my invention; and Fig. 2 is a sectional view taken along line 2—2 of Fig. 1.

Referring to the drawing, I have shown an embodiment of my improved dynamoelectric machine in which excitation is provided to the machine by a plurality of field poles 1 magnetically excited by a field exciting winding 2 adapted to be energized by any suitable source of electrical power. These field poles 1 are mounted in any suitable manner in a magnet frame 3 as by being secured thereto by a plurality of bolts 4 and are arranged in circumferentially spaced relation to each other and radially spaced by a conventional air gap 5 from a laminated core 6 of magnetic material for an armature of the machine. The armature core 6 is mounted on a quill shaft 7 which is mechanically coupled by a suitable splined connection 8 to a torsion rod shaft 9 formed with a splined coupling end 10 adapted to be connected to an external source of mechanical power where the machine is to be used as a generator. The armature is rotatably supported by suitable antifriction bearings 11 and 12 mounted respectively around the quill shaft 7 in bearing housings formed in end shield members 13 and 14, respectively, which are suitably secured to the magnet frame 3 of the machine.

In order to increase the capacity of the machine, axially or longitudinally extending ventilating passages 15 are formed through the laminated core 6 of the armature and communicate with exhaust openings 16 formed in the end shield 13 to permit the passage of air through the armature for removal of heat from the core

2

6 which may be generated therein by eddy currents and by electric current flowing through an armature winding 17 arranged in suitable winding slots in the armature core 6. This ventilating air may be supplied to the machine by any suitable arrangement and is shown as being supplied thereto by a cowling 18 adapted to be connected to a suitable source of ventilating medium supply, such as air under pressure. This ventilating air is supplied into the end shield 14 and is adapted to pass around the poles 1 and through the air gap 5 as well as through the longitudinally extending armature ventilating passages 15. In order to utilize the armature ventilating passages 15 more effectively, an arrangement is provided in which the commutator is formed of a plurality of commutator segments 19 suitably insulated from each other by insulating spacers 20 and from the supporting and retaining parts of the commutator by insulators 21, 22, and 23, and cooling air is adapted to flow over the commutator into the core passages 15. Each commutator segment is formed with a riser 24 which extends outwardly therefrom and is of substantially smaller width than the segments 19, thereby providing ventilating passages between adjacent risers communicating with the core ventilating passages 15. In order further to provide relatively large inlet openings for the armature ventilating passages 15, the armature winding 17 is connected to the commutator segments 19 by leads 25 which extend outwardly towards the commutator segment risers 24 and are connected thereto by a substantially radially superposed arrangement of predetermined winding lead connections 26 which have substantially the same width as the risers 24 and are securely mechanically and electrically connected to the risers in any suitable manner, as by being brazed thereto in any desired manner, as through the use of a silver solder or other suitable material. This arrangement provides relatively large substantially axially extending ventilating passages 27 between adjacent lead connections which communicate with the core ventilating passages 15. The centrifugal fan action of the armature lead connections 26 and the risers 24 and the effect of centrifugal force on the leads 25 are minimized by the arrangement of a suitable circumferentially extending binding around the outer periphery of these leads. This is preferably formed by applying a suitable insulation 28 over the outer surface of the leads 25 and tightly winding a binding wire 29 around the outer periphery of the superposed winding lead connections, thus securely retaining the winding lead connections in position and forming an effective closure around the outside of the ventilating passages 27. This construction also has been found to increase very markedly the capacity of a given size machine by the improved ventilating system which effectively removes heat from the commutator by the direction of a ventilating medium flow directly over the commutator segments and also by the increased flow of ventilating medium under the end connections and end turns of the armature winding as well as through the substantially axially extending ventilating passages through the armature core.

While I have illustrated and described a particular embodiment of my invention, modifications thereof will occur to those skilled in the art. I desire it to be understood, therefore, that my invention is not to be limited to the particular arrangement disclosed, and I intend in the appended claims to cover all modifications which do not depart from the spirit and scope of my invention.

What I claim as new and desire to secure by Letters Patent of the United States is:

1. A dynamoelectric machine armature having a core with winding slots therein, a winding in said slots, ventilating passages extending through said core, a commutator having a plurality of commutator segments, and winding lead connections from said winding to said commutator including a radially superposed arrangement of predetermined substantially axially extending winding lead connections on radially outermost surfaces of said commutator segments and being brazed thereto providing a good electrical connection therewith and forming ventilating passages between lead connections on adjacent segments communicating with said core ventilating passages.

2. A dynamoelectric machine armature having a core with winding slots therein, a winding in said slots, ventilating passages extending through said core, a commutator having a plurality of commutator segments each having a riser portion formed integral therewith, winding lead connections of said winding to said commutator including a substantially radially superposed arrangement of predetermined winding lead connections on said commutator segment riser portions and being brazed thereto with the inner surfaces of at least some of said connections engaging the outermost surfaces of said risers providing a good electrical connection therewith and forming ventilating passages between lead connections and between risers on adjacent segments communicating with said core ventilating passages, and means including a circumferentially extending binding around the outer periphery of said superposed winding lead connections for retaining said winding lead connections in position.

3. A dynamoelectric machine armature having a core with winding slots therein, a winding in said slots, ventilating passages extending through said core, a commutator having a plurality of commutator segments with risers of substantially smaller width than said segments providing ventilating passages between adjacent risers communicating with said core ventilating passages, winding lead connections of said winding to said commutator including a radially superposed arrangement of predetermined winding lead connections on the outermost surfaces of said commutator risers, and said winding lead connections having substantially the same width as said risers and being brazed thereto providing a good electrical connection therewith and forming ventilating passages between lead connections on adjacent risers communicating with said core ventilating passages.

4. A dynamoelectric machine armature having a core with winding slots therein, a winding in said slots, ventilating passages extending through said core, a commutator having a plurality of commutator segments with risers of substantially smaller width than said segments providing ventilating passages between adjacent risers communicating with said core ventilating passages, winding lead connections of said winding to said commutator including a radially superposed arrangement of predetermined winding lead connections on the outermost surfaces of said commutator risers and being brazed thereto providing a good electrical connection therewith and forming ventilating passages between lead connections on adjacent segments communicating with said core ventilating passages, and means including a circumferentially extending binding around the outer periphery of said superposed winding lead connections for retaining said winding lead connections in position.

5. A dynamoelectric machine armature having a core with winding slots therein, a winding in said slots, substantially axially extending ventilating passages through said core, a commutator having a plurality of commutator segments with risers of substantially smaller width than said segments providing ventilating passages between adjacent risers communicating with said core ventilating passages, winding lead connections of said winding to said commutator including a radially superposed arrangement of predetermined winding lead connections on the outermost surfaces of said commutator risers, said winding lead connections having substantially the same width as said risers and being brazed thereto providing a good electrical connection therewith, and ventilating passages between lead connections on adjacent segments communicating with said core ventilating passages, and means including a circumferentially extending binding comprising wire around the outer periphery of said superposed winding lead connections insulated from said connections for retaining said winding lead connections in position.

STEWART E. GAIL.

REFERENCES CITED

The following references are of record in the file of this patent:

UNITED STATES PATENTS

| Number | Name | Date |
| --- | --- | --- |
| 319,578 | Hamilton | June 9, 1885 |
| 969,892 | Lord | Sept. 13, 1910 |
| 1,030,061 | Elshoff | June 18, 1912 |
| 1,399,832 | Wait | Dec. 13, 1921 |
| 2,307,516 | Kreh | Jan. 5, 1943 |

FOREIGN PATENTS

| Number | Country | Date |
| --- | --- | --- |
| 421,280 | Germany | Nov. 9, 1925 |